Patented Apr. 17, 1945

2,373,693

UNITED STATES PATENT OFFICE 2,373,693

MONOAZO DYESTUFFS

Arthur Howard Knight and William Elliot Stephen, Blackley, Manchester, England, assignors to Imperial Chemical Industries Limited, a corporation of Great Britain No Drawing. Application December 14, 1942, Serial No. 468,988. In Great Britain December 17, 1941

5 Claims. (Cl. 260—199)

The present invention relates to new monoazo acid dyestuffs suitable for colouring animal fibres.

According to the invention we make the dyestuffs by diazotising an amine of the general formula X—CO—NY—R—NH$_2$ in which R stands for a m- or p-phenylene nucleus, which may be further substituted by simple azo dyestuff substituents, for example, methyl, methoxy or sulphonic acid groups, X stands for a monochloro- or monobromo-alkyl radical having not more than three carbon atoms, and Y stands for hydrogen, alkyl (C$_1$ to C$_6$), cycloalkyl, aralkyl, alkoxyalkyl or aryl, and coupling the resulting diazonium compound in alkaline, neutral or acid media, with 2-phenyl-amino-8-naphthol-6-sulphonic acid, or derivatives thereof wherein the phenyl radical is substituted, for example, by halogen, alkyl or alkoxy.

Also according to the invention we use the dyestuffs for colouring animal fibres, e. g. wool and silk.

The dyestuffs dye wool from an acid bath in various shades of brown, the dyeings being characterised by very good fastness to severe washing and milling, and good fastness to light.

As examples of diazo components which can be employed according to the invention are mentioned 4-amino-1-N-ethyl-, isopropyl-, n-butyl-, sec.butyl-, cyclohexyl, o-methylcyclohexyl, p-methylcyclohexyl, benzyl-, β-methoxyethyl-, β-ethoxyethyl-, and phenyl-omega-chloroacetanilides, 4-amino-1-N-ethyl-, isopropyl-, and cyclohexyl-omega-chloropropion-anilides, 4-amino-2-N-ethyl-omega-chloroacet-, omega-chloropropion-, omega-bromo-propion-, and α-bromopropion- toluidides, 3-amino-1-N-benzyl-omega-chloroacetanilide, 4-amino-2-N-benzyl-omega-chloroacet-toluidide and anisidide, 2-amino-4- and 5-N-ethyl-omega-chloracet-toluidides, 5-amino-2-N-cyclohexyl-omega-chloroacet - toluidide, 4-amino-2-N-ethyl-α-bromo-butyric-toluidide and 4-amino-2-N-ethyl-α-bromo-iso butyric-toluidide.

The foregoing amines are obtainable by interaction between the appropriate nitro secondary amine and the appropriate halogenoacyl halide followed by reduction of the nitro group of the resulting acylated compound.

Further examples of diazo components of this invention are 3-amino-omega-chloroacetanilide-4-sulphonic acid (obtainable by interaction between 1:3-diaminobenzene-4-sulphonic acid and chloroacetyl chloride), 3-amino-omega-chloropropionanilide-4-sulphonic acid (obtainable by interaction between 1:3-diaminobenzene-4-sulphonic acid and chloropropionyl chloride) and 4-amino-omega-chloroacetanilide-3-sulphonic acid (obtainable by interaction between 1:4-diaminobenzene-4-sulphonic acid and chloroacetyl chloride).

As examples of coupling components which can be employed according to the invention, we mention 2-phenylamino-8-naphthol-6-sulphonic acid and its derivatives in which the phenyl radical carries o-, m-, and p-methyl-, o-, and p-methoxy and p-ethoxy and o-, m-, and p-chloro and p-carboxy and p-(N-ethyl-N-acetylamino)-substituents.

The provisional specification of Specification No. 216,971 refers to combining a diazo compound of a benzene derivative which contains an alkylacidylamino group, e. g. 4-ethylacetylamino-2-toluidine, with an azo dyestuff component, e. g. p-methoxyphenyl-2-amino-8-naphthol - 6 - sulphonic acid, but none of the diazo components mentioned contains halogen, which is characteristic of those of the present invention. Moreover the present dyestuffs are distinguished by their superior fastness to severe washing and milling.

Specification No. 340,640 relates to coupling a diazotised N-acyl-cyclohexylaminoarylamine or substitution product thereof, e. g. 1-(N-benzoyl-cyclohexylamino)-4-aminobenzene, with an azo component containing a sulphonic and/or carboxylic group, e. g. 2-(o-methoxy-phenyl-amino)-8-naphthol-6-sulphonic acid, but discloses no halogenoacyl groups which characterise the present diazo components. Moreover the present dyestuffs surpass the brown dyestuffs of Example 3 of the said specification in fastness to severe washing.

Specification No. 472,171 describes coupling diazotised N-acyl-N-alkyl-phenylenediamines in which the alkyl group is isopropyl, or β-methyl or ββ'-dimethylisopropyl, and the phenylene residue may contain further substituents, e. g. 1-(N-acetylisopropylamino)-4-aminobenzene, with a coupling component, e. g. 2-amino-8-naphthol-6-sulphonic acid, but discloses no diazo nor coupling component of the present invention, nor any dyestuff yielding brown shades on wool.

The invention is illustrated, but not limited, by the following examples in which the parts are by weight.

Example 1

21.25 parts of 4-amino-1-N-ethyl-omega-chloroacetanilide are dissolved in a mixture of 300 parts of water and 25 parts of 36% hydrochloric acid. To the resulting solution there is added a solution of 6.9 parts of sodium nitrite in 50 parts of water. The solution of the diazo compound is cooled to 5–10° C. It is then added gradually to a cooled and stirred mixture of 34 parts of sodium 2-phenylamino-8-naphthol-6-sulphonate, 600 parts of water and 27 parts of sodium acetate crystals. After stirring for about three hours coupling is complete. 40 parts of sodium chloride are then added. Stirring is continued for two hours and the separated dyestuff filtered off and dried. The new dyestuff dyes wool in brown shades from a dyebath containing sulphuric acid and Glauber's salt. The dyeings possess very good fastness to severe washing and milling, and good fastness to light.

If the coupling is carried out in a medium alkaline with sodium carbonate, a dyestuff is obtained yielding on wool somewhat yellower shades of brown having similar fastness properties.

Example 2

22.6 parts of 4-amino-2-N-ethyl-omega-chloro-acet-toluidide are dissolved in a mixture of 400 parts of water and 25 parts of 36% hydrochloric acid and diazotised at 5–10° C. by the addition of a solution of 6.9 parts of sodium nitrite in 50 parts of water. The solution of the diazonium compound is added gradually to a cooled and stirred solution of 37 parts of sodium 2-(p-methoxyphenyl)-amino-8-naphthol-6-sulphonate, 1200 parts of water, and 29 parts of sodium acetate crystals. When coupling is complete (after several hours' stirring), 240 parts of sodium chloride are added and the new dyestuff filtered off, and dried at 50–60° C.

The new dyestuff is brownish black in colour. It dissolves in water with a brown colour and dyes wool from a dyebath containing sulphuric acid and Glauber's salt in nigger brown shades, the dyeings having very good fastness to severe washing and milling, and good fastness to light.

Example 3

22.6 parts of 4-amino-2-N-ethyl-omega-chloro-acet-toluidide are diazotised as in Example 2. The cooled solution of the diazo compound is added to a cooled and stirred solution of 37 parts of sodium 2-(p-methoxyphenyl)-amino-8-naphthol-6-sulphonate in 1200 parts of water to which 21 parts of anhydrous sodium carbonate have been added. Coupling is complete within one hour. The dyestuff is then precipitated by the addition of 160 parts of sodium chloride, filtered off, washed with 10% sodium chloride solution, and dried at 50–60° C.

The new dyestuff is brownish black in colour. It dissolves in water with a brown colour and dyes wool from a dyebath containing sulphuric acid and Glauber's salt in nigger brown shades very similar to those given by the dyestuff of Example 2, the dyeings having very good fastness to severe washing, and milling, and good fastness to light.

Example 4

26.65 parts of 4-amino-1-N-cyclohexyl-omega-chloro-acetanilide are dissolved in 400 parts of water and 25 parts of 36% hydrochloric acid and diazotised at 15–30° C. by the addition of a solution of 6.9 parts of sodium nitrite in 50 parts of water. The solution of the diazonium compound, after filtration if necessary, is cooled to 5–7° C. and added with stirring to a similarly cooled solution of 35.5 parts of sodium 2-(p-methylphenyl)-amino-8-naphthol-6-sulphonate in 1000 parts of water containing 21 parts of anhydrous sodium carbonate. The mixture is stirred until coupling is complete when the dyestuff is precipitated by the addition of sodium chloride, filtered off and dried.

The new dyestuff dyes wool from an acid bath in reddish brown shades, the dyeings having very good fastness to severe washing and milling, and good fastness to light.

If in the above example sodium 2-(p-methoxyphenyl)-amino-8-naphthol-6-sulphonate is replaced by 37 parts of sodium 2-o-methoxyphenyl-amino-8-naphthol-6-suphonate a dyestuff is obtained which dyes wool in red-brown shades of similar good fastness properties.

Example 5

22.65 parts of 4-amino-1-N-ethyl-omega-chloro-propionanilide are dissolved in 300 parts of water and 25 parts of 36% hydrochloric acid and 6.9 parts of sodium nitrite added. The resulting diazonium solution is added to a cooled and stirred solution of 37 parts of sodium 2-(p-methoxyphenyl)-amino-8-naphthol-6-sulphonate in 1000 parts of water containing 21 parts of anhydrous sodium carbonate. When coupling is complete 100 parts of sodium chloride are added. The separated dyestuff is filtered off, washed with 10% aqueous sodium chloride and dried at 50°–60° C. The new dyestuff forms a brownish black powder. It is soluble in water with a yellowish brown colour and in concentrated sulphuric acid with a dull yellowish red colour. This dyestuff dyes wool from an acid dyebath in nigger brown shades, the dyeings having good fastness to severe washing, milling and light.

If 34 parts of sodium 2-phenylamino-8-naphthol-6-sulphonate are used instead of the 37 parts of sodium 2-p-methoxyphenylamino-8-naphthol-6-sulphonate employed above, a dyestuff is obtained which yields redder shades of brown on wool, the dyeings having similar fastness properties.

Example 6

24 parts of 4-amino-2-N-ethyl-omega-chloro-propion-toluidide are dissolved in 300 parts of water and 25 parts of 36% hydrochloric acid and diazotised by the addition of 6.9 parts of sodium nitrite. The diazo solution is gradually added to a stirred and cooled solution of 35.5 parts of sodium 2-(m-methylphenyl)-amino-8-naphthol-6-sulphonate in 800 parts of water, the coupling medium being kept neutral to litmus by the simultaneous addition of 10% aqueous sodium carbonate. 100 parts of sodium chloride are added and the separated dyestuff filtered off and dried. It dyes wool from an acid bath in brown shades, the dyeings having good fastness to severe washing and milling.

Example 7

To a solution of 28.65 parts of sodium 3-amino-omega-chloroacetanilide-4-sulphonate in 450 parts of water there are added 35 parts of 36% hydrochloric acid followed by 6.9 parts of sodium nitrite. The diazo solution so obtained is added to a stirred solution at 5°–10° C. of 37 parts of sodium 2-(p-methoxyphenyl)-amino-8-naphthol-6-sulphonate in 1200 parts of water containing 30 parts of anhydrous sodium carbonate. The new dyestuff is precipitated by the addition to the mixture of 20% of sodium chloride, filtered off, washed with 20% aqueous sodium chloride and dried.

The new dyestuff dyes wool from an acid bath in brown shades, the dyeings having good fastness to severe washing, milling and light.

The invention is further illustrated by the examples listed in the following table, wherein the shorter designation gamma acid has been used for 2-amino-8-naphthol-6-sulphonic acid.

not more than 4 carbons and wherein the alkoxy group has 1 to 2 carbons, benzyl and phenyl; and B is one of the group consisting of hydrogen, lower alkyl, lower alkoxy, chloro, carboxy and -N-ethyl-N-acetylamino.

2. A monazo dyestuff in accordance with claim 1 in which the diazo component is unsulfonated.

| Example No. | Diazo component | Coupling component | Coupled in the presence of | Shade on wool |
|---|---|---|---|---|
| 8 | 3-amino-1-N-benzyl-omega-chloroacetanilide | N-o-anisyl-gamma acid | Acetic acid | Very reddish brown. |
| 9 | 4-amino-1-N-phenyl-omega-chloroacetanilide | N-phenyl-gamma acid | Sodium carbonate | Red-brown. |
| 10 | 4-amino-1-N-β-ethoxyethyl-omega-chloroacetanilide | N-p-tolyl-gamma acid | do | Brown. |
| 11 | 4-amino-1-N-ethyl-omega-chloroacetanilide | N-o-tolyl-gamma acid | Acetic acid | Reddish brown. |
| 12 | do | N-m-tolyl-gamma acid | do | Brown. |
| 13 | do | do | Sodium carbonate | Do. |
| 14 | do | N-p-tolyl-gamma acid | Acetic acid | Do. |
| 15 | do | do | Sodium carbonate | Reddish nigger brown. |
| 16 | do | N-o-anisyl-gamma acid | Acetic acid | Reddish brown. |
| 17 | do | N-p-anisyl-gamma acid | do | Do. |
| 18 | do | N-p-ethoxy-phenyl-gamma acid. | do | Brown. |
| 19 | 4-amino-2-N-ethyl-omega-chloro-acet-toluidide | N-o-tolyl-gamma acid | do | Reddish brown. |
| 20 | do | N-m-tolyl-gamma acid | do | Brown. |
| 21 | do | N-m-tolyl-gamma acid | Sodium carbonate | Do. |
| 22 | do | N-p-tolyl-gamma acid | do | Do. |
| 23 | do | N-o-anisyl-gamma acid | Acetic acid | Red-brown. |
| 24 | do | N-p-anisyl-gamma acid | do | Nigger brown. |
| 25 | do | N-phenyl-gamma acid | Sodium carbonate | Brown. |
| 26 | do | N-p-ethoxyphenyl-gamma acid | Acetic acid | Nigger brown. |
| 27 | 4-amino-1-N-cyclohexyl-omega-chloro-propionanilide | N-phenyl-gamma acid | Sodium carbonate | Red-brown. |
| 28 | do | N-p-anisyl-gamma acid | do | Nigger brown. |
| 29 | 4-amino-2-N-ethyl-α-bromo-propion-toluidide | N-phenyl-gamma acid | do | Red-brown |
| 30 | 4-amino-2-N-ethyl-omega-bromopropion-toluidide | do | do | Do. |
| 31 | 4-amino-1-N-cyclohexyl-omega-chloroacet-anilide | N-o-anisyl-gamma acid | Acetic acid | Reddish brown. |
| 32 | 4-amino-1-N-ethyl-omega-chloropropion-anilide | N-o-chlorophenyl-gamma-acid | do | Very reddish brown. |
| 33 | do | N-o-anisyl-gamma acid | Sodium carbonate | Reddish brown. |
| 34 | do | N-phenyl-gamma acid | Acetic acid | Red-brown. |
| 35 | 2-amino-4-N-ethyl-omega-chloroacet-toluidide | N-p-anisyl-gamma acid | Sodium carbonate | Nigger brown. |
| 36 | 2-amino-5-N-ethyl-omega-chloroacet-toluidide | N-phenyl-gamma acid | do | Red-brown. |
| 37 | do | N-p-anisyl-gamma acid | do | Nigger brown. |
| 38 | 4-amino-2-N-ethyl-omega-chloroacet-toluidide | N-p-(N'-ethyl-N'-acetylamino)-phenyl-gamma acid. | do | Red-brown. |
| 39 | 4-amino-2-N-benzyl-omega-chloroacet-toluidide | N-phenyl-gamma acid | do | Do. |
| 40 | 5-amino-2-N-cyclohexyl-omega-chloroacet-toluidide | N-o-anisyl-gamma acid | do | Reddish brown. |
| 41 | 4-amino-1-N-iso-propyl-omega-chloro-acetanilide | N-phenyl-gamma acid | do | Do. |
| 42 | 4-amino-1-N-sec-butyl-omega-chloro-acetanilide | do | do | Do. |
| 43 | 4-amino-1-N-n-butyl-omega-chloracetanilide | N-o-anisyl-gamma acid | do | Do. |
| 44 | do | N-o-tolyl-gamma acid | do | Do. |
| 45 | 4-amino-2-N-ethyl-omega-chloroacet-toluidide | N-p-carboxyl-phenyl-gamma acid. | do | Red brown. |
| 46 | 4-amino-1-N-β-methoxyethyl-omega-chloro-acetanilide | N-p-tolyl-gamma acid | do | Brown. |

We claim:
1. A monazo dye which in the form of its acid is represented by the formula

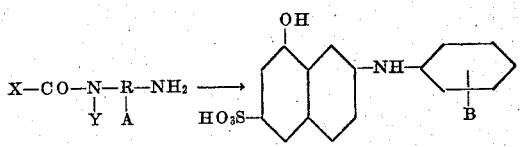

wherein —R—NH₂ is an arylene nucleus of the group consisting of anilino, toluino and anisidino nuclei substituted in the meta- or para-position by the group

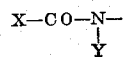

A is one of a group consisting of hydrogen and sulfonic acid; X is a mono-halogeno-alkyl group having not more than 3 carbons in which halogen is one of the group consisting of chlorine and bromine; Y is one of the group consisting of hydrogen, alkyl having 1 to 6 carbons, cyclohexyl, mono-methyl-cyclohexyl, alkoxy-alkyl having 3. The monazo dyestuff which in the form of its acid is represented by the formula

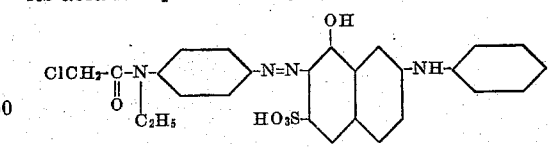

4. The monazo dyestuff which in the form of its acid is represented by the formula

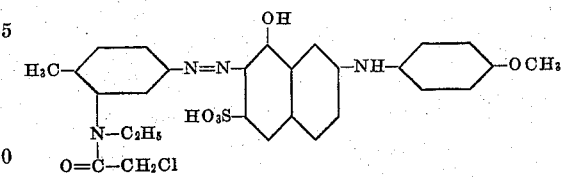

5. The monazo dyestuff which in the form of its acid is represented by the formula

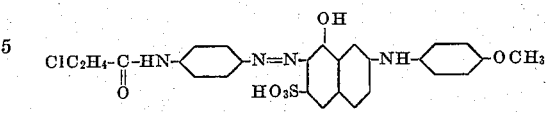

ARTHUR HOWARD KNIGHT.
WILLIAM ELLIOT STEPHEN.